(12) United States Patent
Yang et al.

(10) Patent No.: US 8,152,179 B2
(45) Date of Patent: Apr. 10, 2012

(54) WHEEL FRAME ASSEMBLY FOR QUICK EXPANSION AND FOLDING

(75) Inventors: Sai-Wei Yang, Taipei (TW); Yu-Chun Fang, Taipei (TW)

(73) Assignees: Sai-Wei Yang, Wanhua District, Taipei (TW); Yu-Chun Fang, Wanhua District, Taipei (TW); Tai-Heia Tang, Wanhua Disitrict, Taipei (TW)

( * ) Notice: Subject to any disclaimer, the term of this patent is extended or adjusted under 35 U.S.C. 154(b) by 599 days.

(21) Appl. No.: 12/268,452

(22) Filed: Nov. 11, 2008

(65) Prior Publication Data

US 2010/0117336 A1 May 13, 2010

(51) Int. Cl.
*B62B 3/02* (2006.01)
(52) U.S. Cl. ............... 280/39; 280/38; 280/647
(58) Field of Classification Search ............ 280/39, 280/649, 43.13, 38, 647
See application file for complete search history.

(56) References Cited

U.S. PATENT DOCUMENTS

| 2,415,629 | A | * | 2/1947 | Ford | 280/39 |
| 2,534,539 | A | * | 12/1950 | Topper | 280/7.1 |
| 2,587,688 | A | * | 3/1952 | Bosk | 280/39 |
| 4,659,096 | A | * | 4/1987 | Leimgruber | 280/39 |
| 5,318,311 | A | * | 6/1994 | Bofill | 280/30 |
| 5,403,022 | A | * | 4/1995 | Snider | 280/30 |
| 7,201,385 | B2 | * | 4/2007 | Renz et al. | 280/79.11 |
| 7,784,816 | B2 | * | 8/2010 | Jian et al. | 280/651 |
| 7,819,409 | B2 | * | 10/2010 | Chang | 280/47.371 |

* cited by examiner

*Primary Examiner* — Katy M Ebner

(57) ABSTRACT

A wheel frame assembly capable of being folded and expansion rapidly for carrying out and storage easily and conveniently. A wheel frame assembly comprises a retainer frame having two parallel retaining rods; at least two rotary units; each rotary unit being formed by assembling a sleeve with a wheel; an active frame have two parallel active rods; each active rod being penetrated by a guide shaft; a telescopic rod having an inner rod and an outer rod engaged to inner rod; the telescopic rod being connected to a latch for controlling the telescopic movement of the inner rod; the actuation of the latch being performed by a handle. Another, a pin assembly can be used to replaced the telescopic rod. The pin assembly includes a rod unit engaged to the rotary unit and a wire for controlling the rod unit to separate from the rotary unit.

5 Claims, 11 Drawing Sheets

WHEEL FRAME ASSEMBLY FOR QUICK EXPANSION AND FOLDING

FIELD OF THE INVENTION

The present invention relates to wheel frames, in particular to a wheel frame assembly being capable of rapid folding and expansion, for the purpose of easy storage and carrying

BACKGROUND OF THE INVENTION

The size of wheel limits the application of a carrier. In the prior art, wheels have different sizes in diameter to be used in different fields, for instance, wheelchairs or carts are suitable for small sized wheels. In these devices, the wheels are attached to a wheel frame in connection to the seat and seat frame for energy saving and mass delivery. Since the wheels attached to bottom of frame, the apparent size of the carrier is enlarged and perturbed when placed in the trunk.

SUMMARY OF THE INVENTION

Accordingly, the primary objective of the present invention is to provide a wheel frame assembly capable of being folded and expanded rapidly so as to have a reduced volume for carrying out and storage easily and conveniently.

The wheel frame assembly capable of being folded and expanded of the present invention comprises a retainer frame having two parallel retaining rods and at least one transversal rod to be between the two retaining rods so that the two retaining rods are firmly secured in a parallel relation; at least two rotary units; each rotary unit being formed by assembling a sleeve with a wheel; an inner wall of the sleeve being formed with a slightly cambered guide trench; a front end of the guide trench being higher than a rear end thereof; each sleeve of the rotary units being engaged to a corresponding one of front ends and rear ends of the two retaining rods so that the sleeves can drive the wheels to rotate along the two retaining rods; an active frame have two parallel active rods; at least one transversal bar for positioning the active rods; each active rod being penetrated by a guide shaft; the guide shaft penetrating through a bottom of the active rod so that the active frame is fixed at an upper side of the retainer frame and each guide shaft is penetrated into a higher portion of the guide trench of the rotary unit; a telescopic rod having an inner rod and an outer rod engaged to inner rod; the telescopic rod being connected to a latch for controlling the telescopic movement of the inner rod; the actuation of the latch being performed by a handle; when the handle is opened, the inner rod will reduce into the outer rod; the outer rod of the telescopic rod being connected to the transversal rod of the retainer frame; and an end portion of the inner rod being movably connected to the transversal rod of the active frame. Moreover, each retaining rod is engaged with a bush having three axial holes for retaining the transversal rod and the active rods of the active frame.

Moreover, the present invention provides a wheel frame assembly capable of being folded and expansion comprises a retainer frame having two parallel retaining rods and at least one transversal rod to be between the two retaining rods so that the two retaining rods are firmly secured in a parallel relation; at least two rotary units; each rotary unit being formed by assembling a sleeve with a wheel; an inner wall of the sleeve being formed with a slightly cambered guide trench; a front end of the guide trench being higher than a rear end thereof; each sleeve of the rotary units being engaged to a corresponding one of front ends and rear ends of the two retaining rods so that the sleeves can drive the wheels to rotate along the two retaining rods; an active frame have two parallel active rods; at least one transversal bar for positioning the active rods; each active rod being penetrated by a guide shaft and a positioning block; the guide shaft penetrating through a bottom of the active rod; each positioning block having a stud; each active rod passing through one axial hole of the bush so that the active frame is fixed at an upper side of the retainer frame and each guide shaft being penetrated into the guide trench of the rotary unit; a pin assembly installed to the retaining rod of the retainer frame; the pin assembly including a rod unit which is engaged to the rotary unit; the pin assembly having a wire for controlling the rod unit to separate from the rotary unit; the wire being connected to a switch on the linkage; when the switch is turn on, the wire is tightened, the rod unit will separate from the rotary unit.

The various objects and advantages of the present invention will be more readily understood from the following detailed description when read in conjunction with the appended drawings.

DETAILED DESCRIPTION OF THE INVENTION

In order that those skilled in the art can further understand the present invention, a description will be provided in the following in detail. However, these descriptions and the appended drawings are only used to cause those skilled in the art to understand the objects, features, and characteristics of the present invention, but not to be used to confine the scope and spirit of the present invention defined in the appended claims.

The structure of the present invention will be described herein with reference to the attaching drawings.

Figure 1:
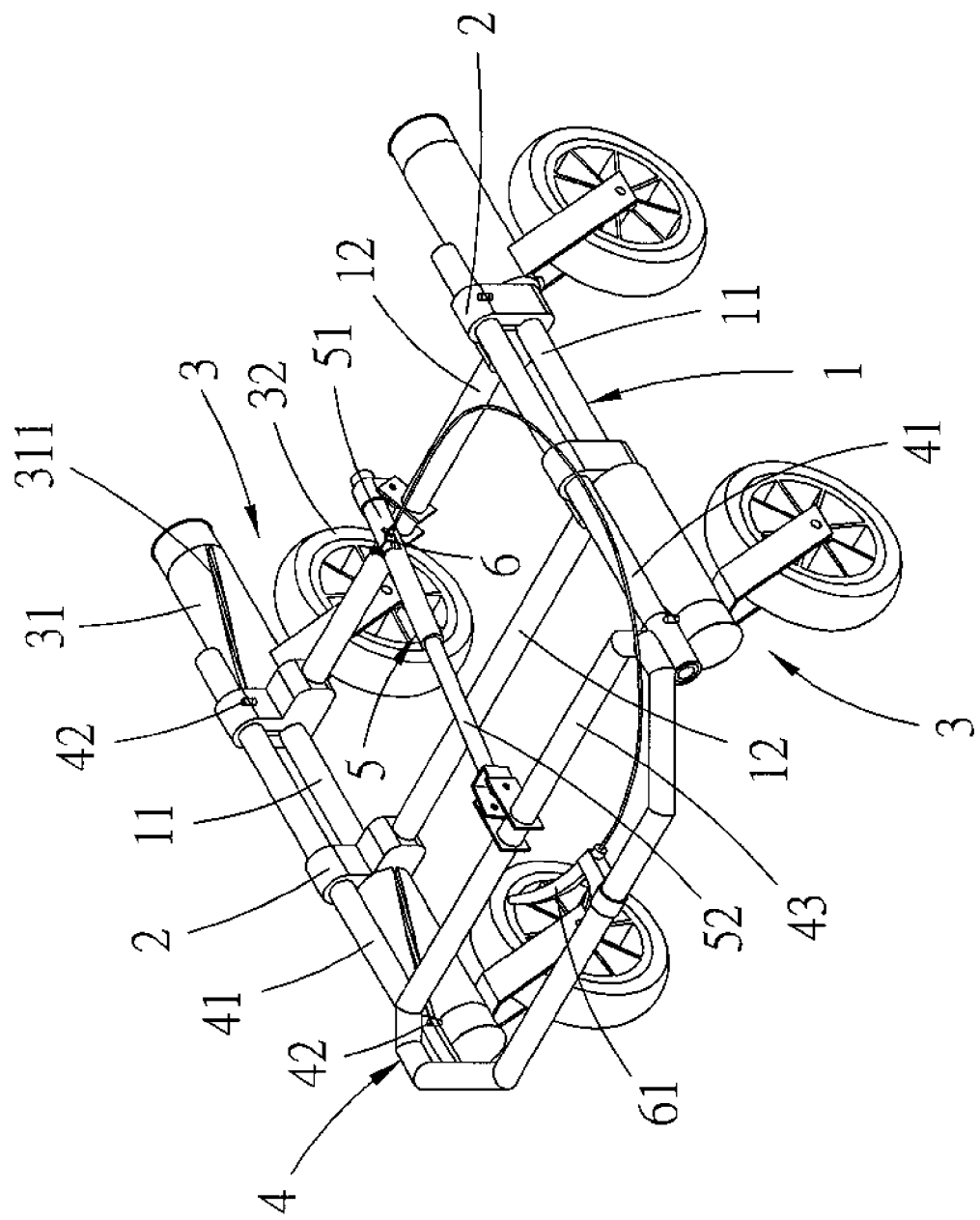
FIG. 1 is a schematic view of the wheel frame assembly capable of being folded and expansion of the present invention.
Figure 2A:
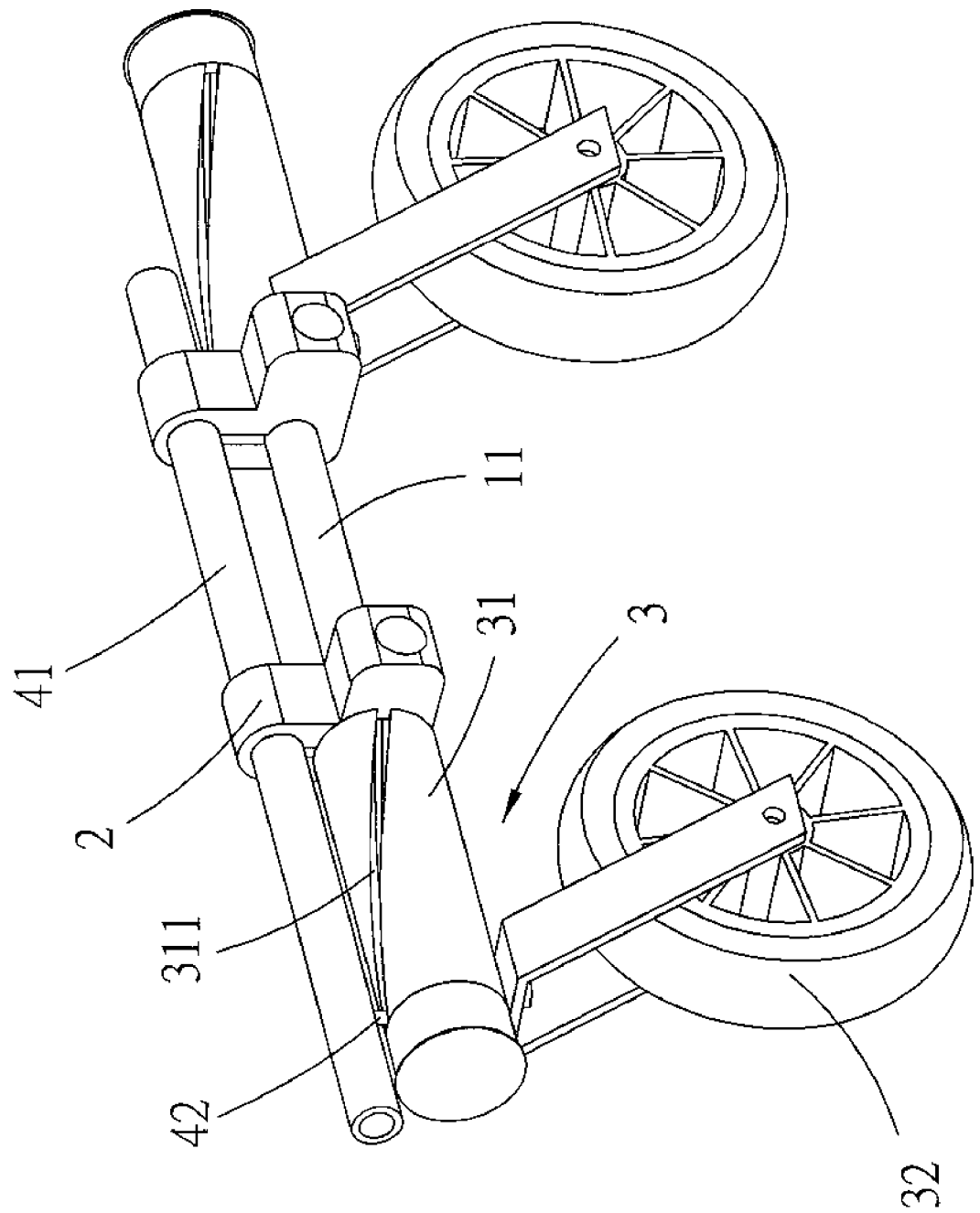
FIGS. 2(A), 2(B) and 2(C) are schematic views showing the operation of the wheel frame assembly capable of being folded and expansion of the present invention.
Figure 2B:
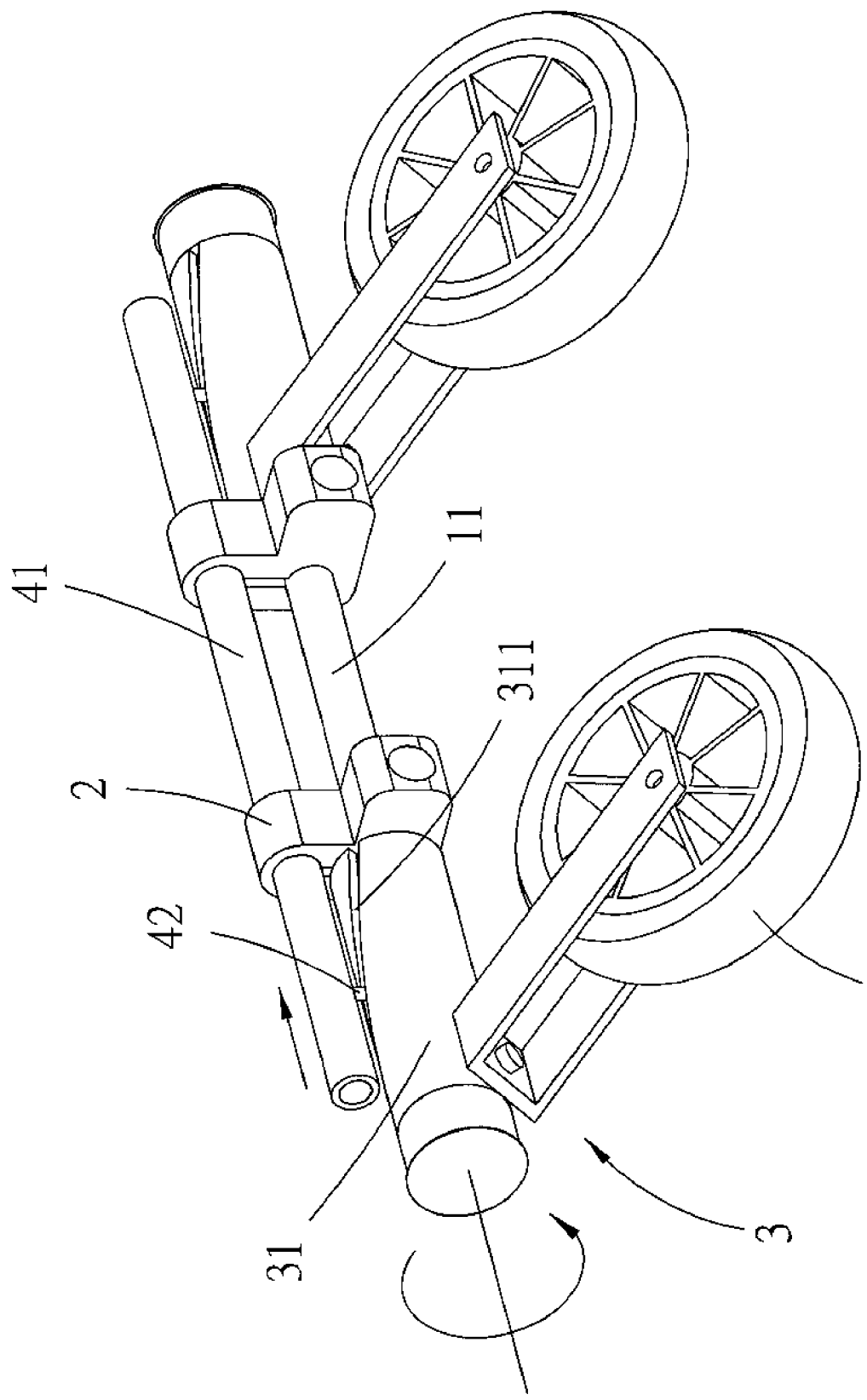
Figure 2C:
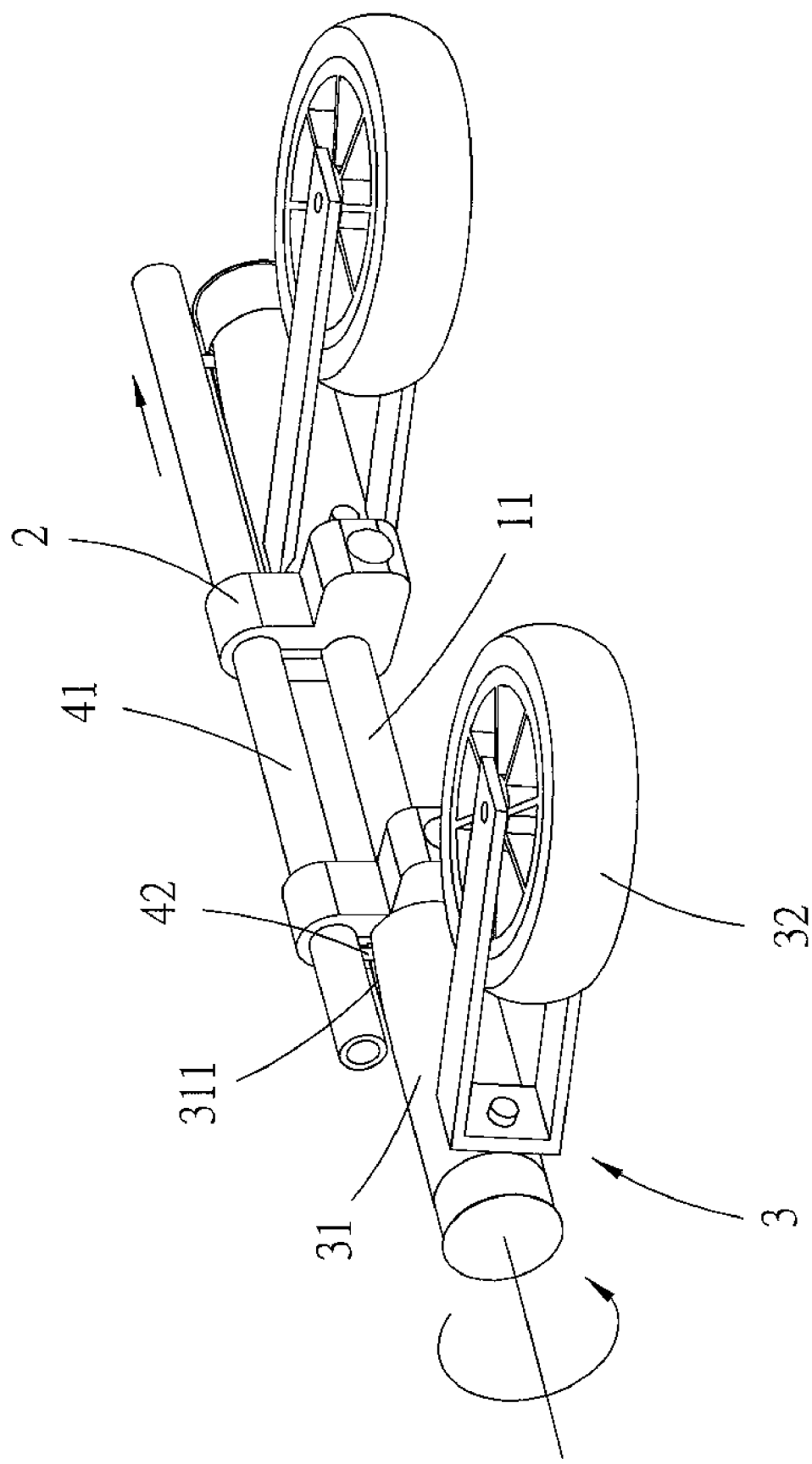

Referring to FIG. 1, the rapidly foldable and expandable wheel frame of the present invention is illustrated. The present invention has the following elements.

A retainer frame 1 has two parallel retaining rods 11. Each retaining rod 11 is engaged with a bush 2 having three axial holes 21. The bushes 2 serves for retaining the transversal rod 12 to be between the two retaining rods 11 so that the two retaining rods 11 are firmly secured in a parallel relation.

Four rotary units 3 are included. Each rotary unit 3 is formed by assembling a sleeve 31 with a wheel 32. An inner wall of the sleeve 31 is installed with a slightly cambered guide trench 311. A front end of the guide trench 311 is higher than a rear end thereof. Four sleeves 31 of the rotary units 3 are engaged to the front ends and rear ends of the two retaining rods 11 so that the sleeves 31 can drive the wheels 32 to rotate along the two retaining rods 11.

An active frame 4 has two parallel active rods 41. A transversal bar 43 serves to connect front ends of the two active rods 41 for positioning the active rods 41. Each of a front end and rear end of each active rod 41 is penetrated by a guide shaft 42. The guide shaft 42 penetrates through a bottom of the active rod 41. Each active rod 41 passes through one of the bush 2 so that the active frame 4 is fixed at an upper side of the retainer frame 1 and each guide shaft 42 is penetrated into a higher portion of the guide trench 311 of the rotary unit 3.

A telescopic rod 5 has an inner rod 52 and an outer rod 51 engaged to inner rod 52. The telescopic rod 5 is connected to a latch 6 for controlling the telescopic movement of the inner rod 52. The actuation of the latch 6 is performed by a handle 61. When the handle 61 is opened, the inner rod 52 will reduce into the outer rod 51. The outer rod 51 of the telescopic rod 5 is connected to the transversal rod 12 of the retainer frame 1. An end portion of the inner rod 52 is movably connected to the transversal rod 12 of the active frame 41. Similarly, the handle 61 of the latch 6 is firmly secured to the active frame 4. The inner rod 52 of the telescopic rod 5 protrudes out of the outer rod 51. The wheel 32 of the rotary unit 3 is vertical to the retainer frame 1.

Referring to FIGS. 1, 2A, 2B and 2C, a schematic view about the operation of the present invention is illustrated. When the wheel 32 of the rotary unit 3 is expanded, if it is desired to fold it, the user can press the handle 61 of the latch 6 so that the latch 6 will be opened so that the inner rod 52 of the telescopic rod 5 will reduce to the outer rod 51; and at the same time, the active rod 41 of the active frame 4 will move therewith. Since the active rod 41 is limited by the bush 2, it can move steadily. Since the end portions of the two active rods 41 are positioned on the higher positions of the guide trenches 311 of the sleeve 31, during the movement of the guide shaft 42, it will move along the guide trench 311 of the sleeve 31 of the rotary unit 3 so that the guide trench 311 will rotate gradually by the driving the guide shaft 42. As a result, the wheel 32 is folded and then parallel to the active frame 4 so that it can be carried and received easily. On the contrary, if it is desired to expand the wheel 32 of the rotary unit 3, similarly, the handle 61 of the latch 6 is pressed so that the inner rod 52 of the telescopic rod 5 will move out of the outer rod 51 to push the active rod 41 of the active frame 4. As a result, the sleeve 31 of the rotary unit 3 will affect by the guide shaft 42 of the active rod 41 to rotate along a reverse direction so that the wheel 32 can be expanded for use.

Figure 3A:
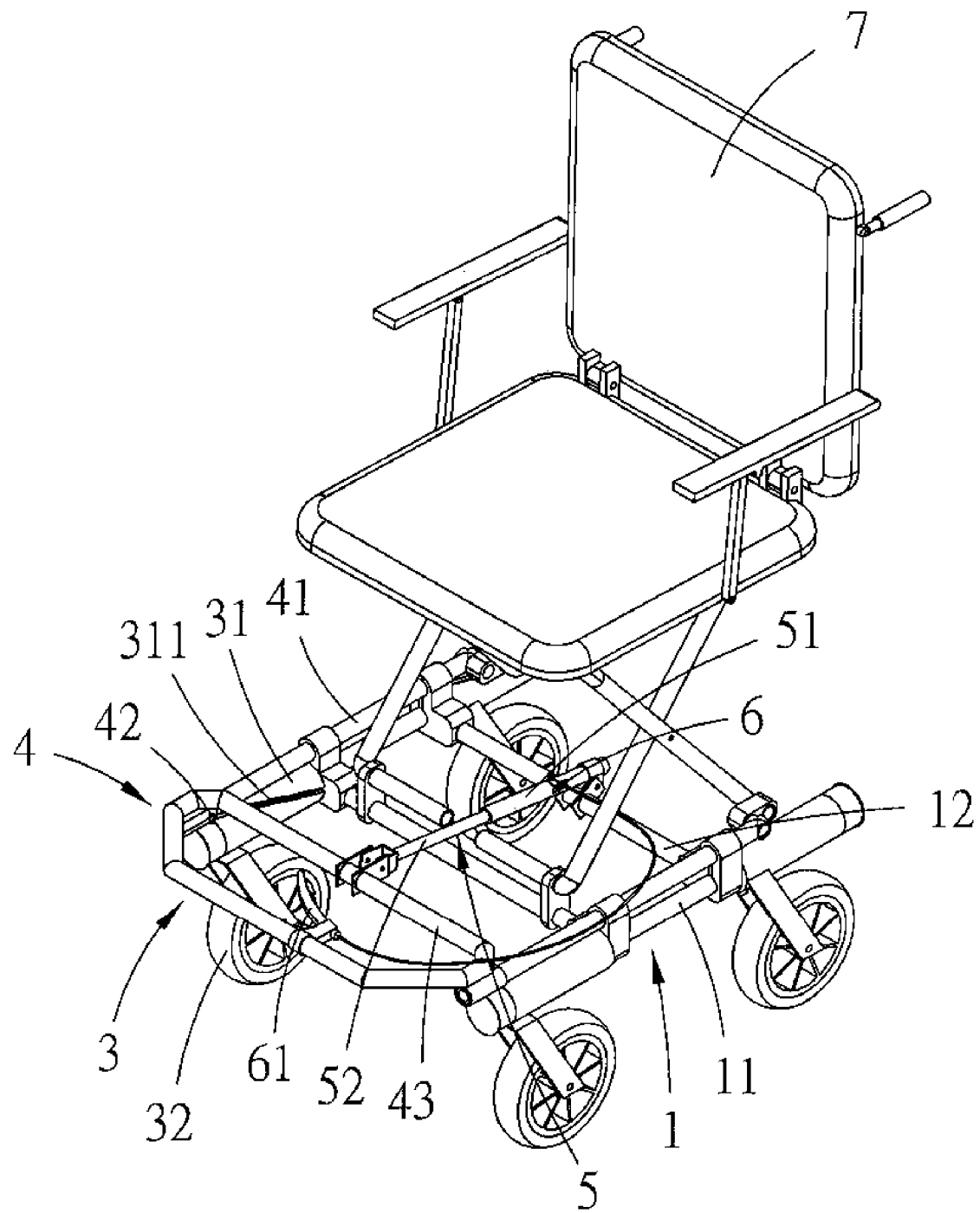
FIGS. 3(A) and 3(B) show the first application of the wheel frame assembly of the present invention.
Figure 3B:
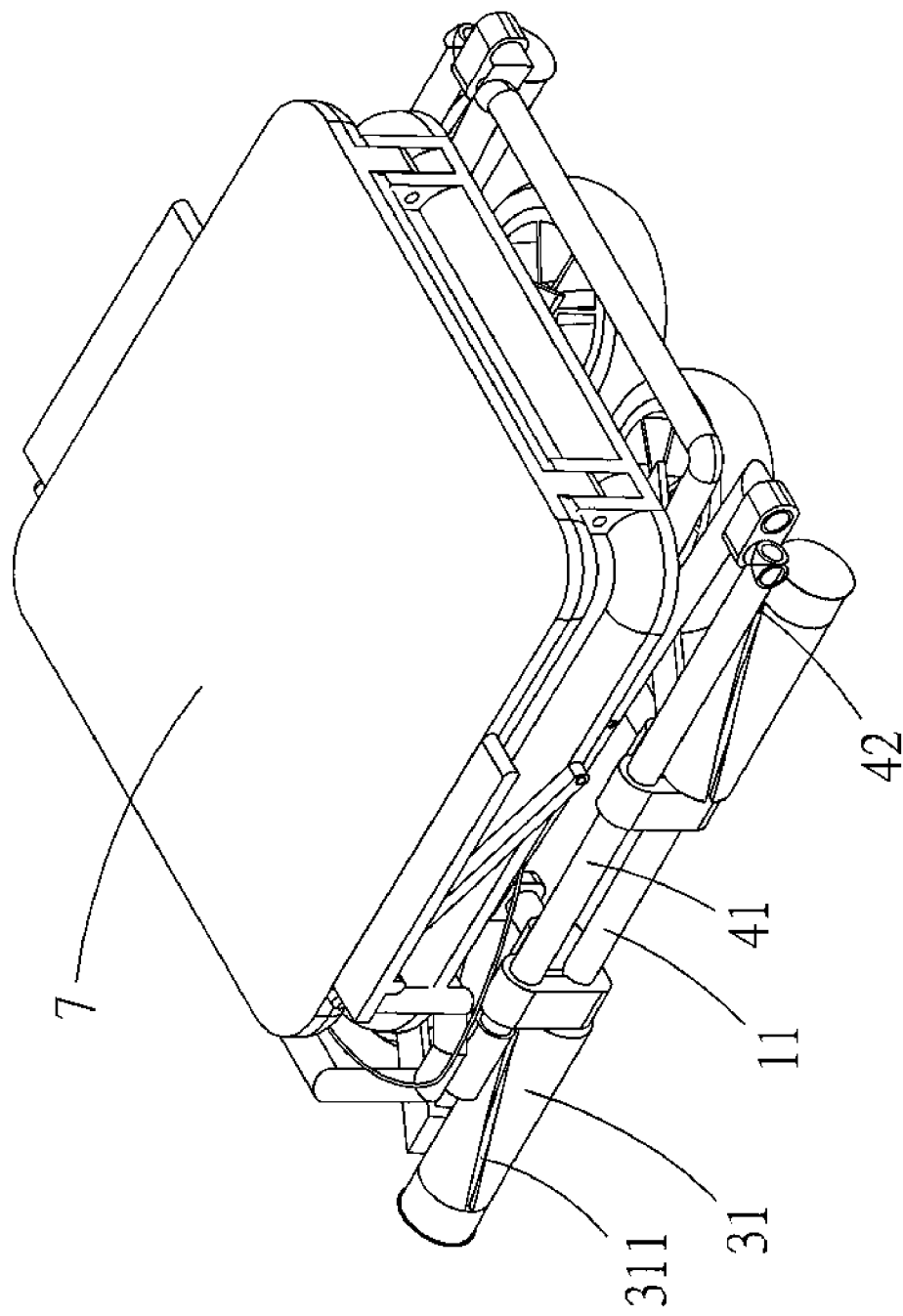
Figure 4:
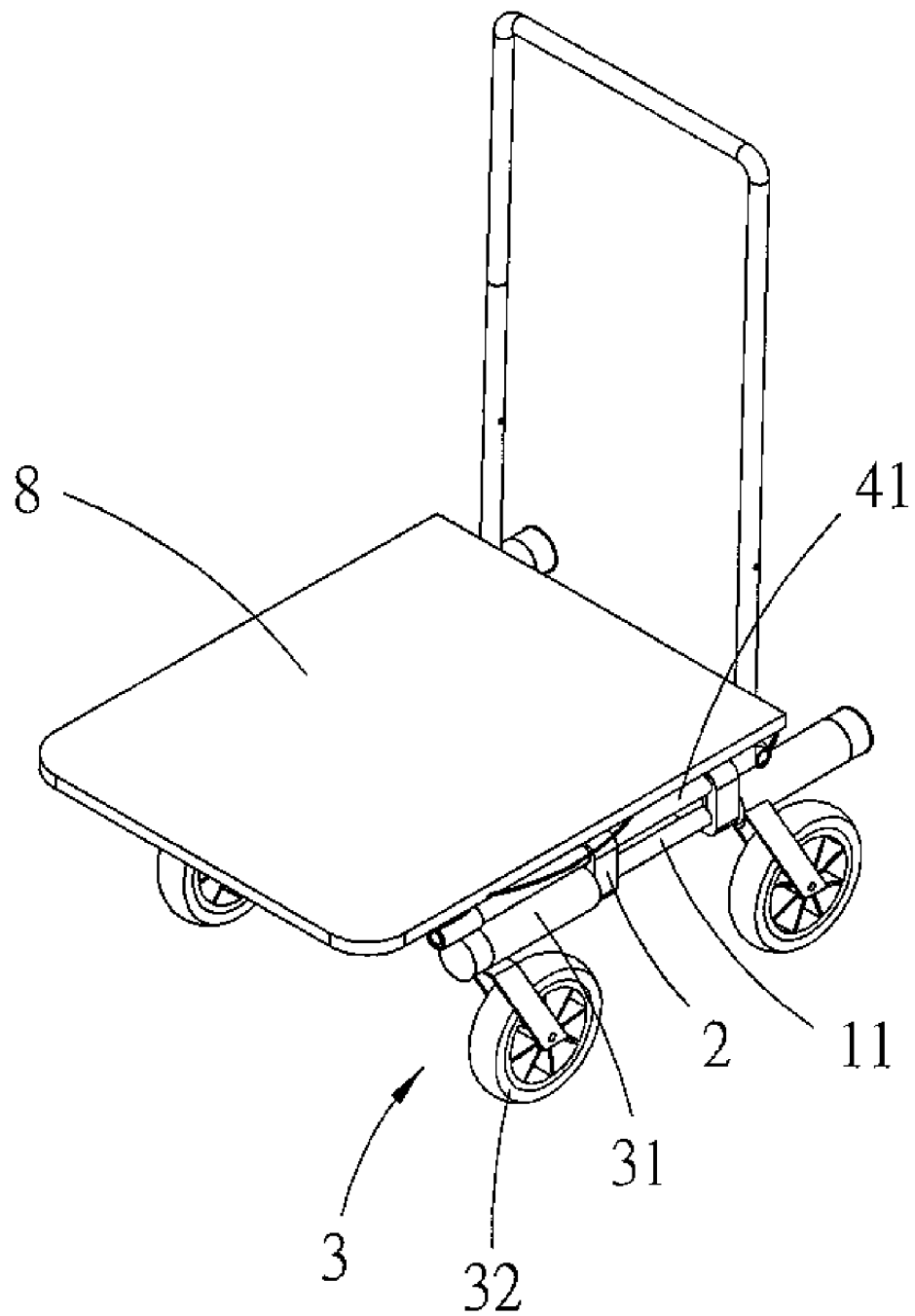
FIG. 4 is a schematic view showing the second application of the wheel frame assembly capable of being folded and expansion of the present invention.
Figure 5:
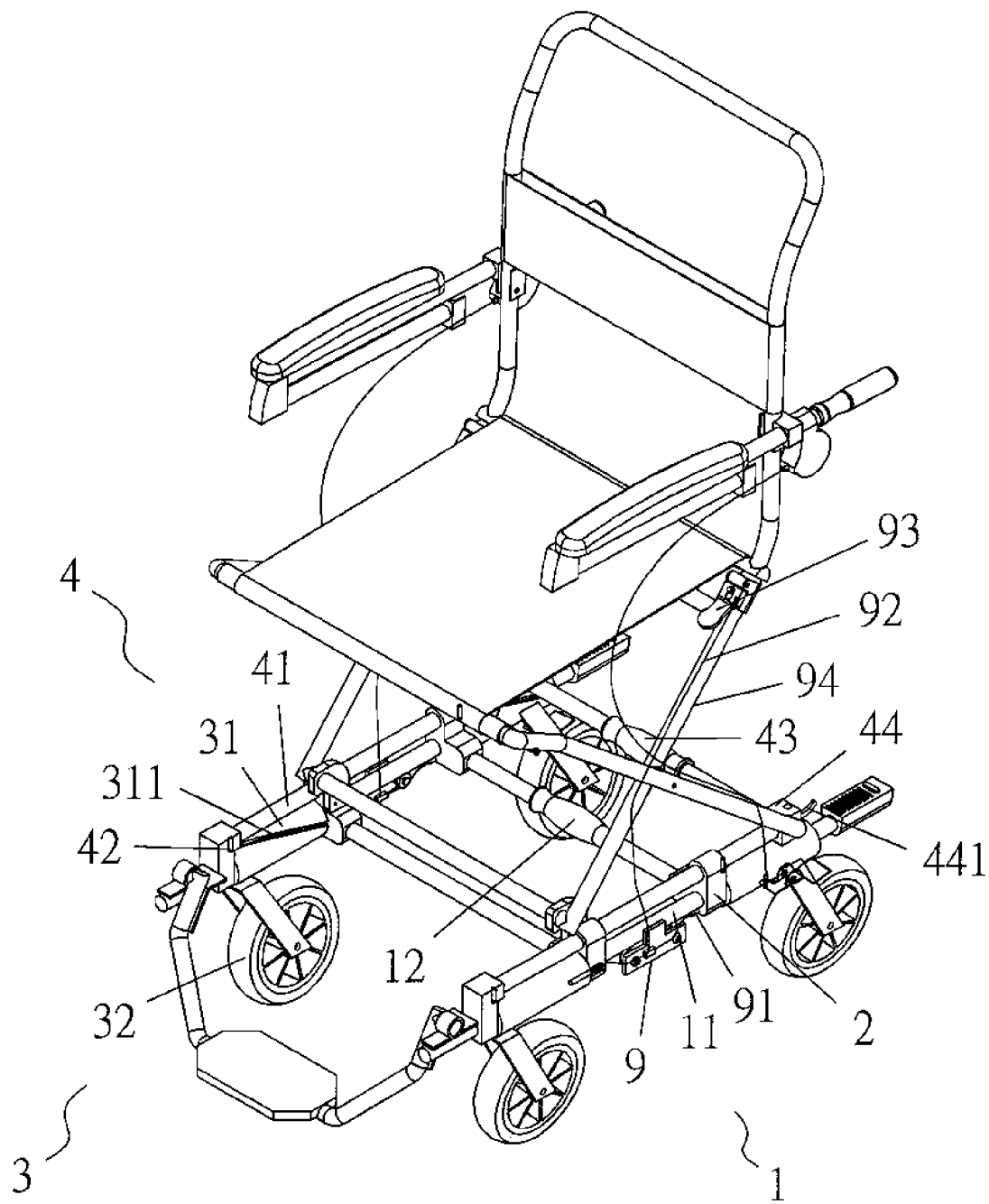
FIG. 5 is a schematic view showing another embodiment of the present invention.

Referring to FIGS. 3A, 3B and 4, the application and schematic view of the present invention are illustrated. It that the retainer frame 1 and the active frame 4 are combined to a wheelchair, a foldable chair, an office chair, a dray, or other object with a wheel so as to provide more function to the object.

Referring to FIGS. 5, 6, 7 and 8, the structure of the present invention has the following elements.

A retainer frame 1 has two parallel retaining rods 11. Each retaining rod 11 is engaged with a bush 2 having three axial holes 2. The bushes 2 serves for retaining the transversal rod 12 to be between the two retaining rods 11 so that the two retaining rods 11 are firmly secured in a parallel relation.

Four rotary units 3 are included. Each rotary unit 3 is formed by assembling a sleeve 31 with a wheel 32. An inner wall of the sleeve 31 is installed with a slightly cambered guide trench 311. A front end of the guide trench 311 is higher than a rear end thereof. Four sleeves 31 of the rotary units 3 are engaged to the front ends and rear ends of the two retaining rods 11 so that the sleeves 31 can drive the wheels 32 to rotate along the two retaining rods 11.

An active frame 4 has two parallel active rods 41. A transversal bar 43 serves to connect front ends of the two active rods 41 for positioning the active rods 41. Each of a front end and rear end of each active rod 41 is penetrated by a guide shaft 42. The guide shaft 42 penetrates through a bottom of the active rod 41 and positioning block 44. Each positioning block 44 has a stud 441. Each active rod 41 passes through one axial hole of the bush 2 so that the active frame 4 is fixed at an upper side of the retainer frame 1 and each guide shaft 42 is penetrated into a higher portion of the guide trench 311 of the rotary unit 3.

A pin assembly 9 is installed to the retaining rod 11 of the retainer frame 1. The pin assembly 9 includes a rod unit 91 which is engaged to the rotary unit 3. The pin assembly 9 has a wire 92 for controlling the rod unit 91 to separate from the rotary unit 3. The wire 92 is connected to a switch 93 on the linkage 94. When the switch 93 is turned on, the wire 92 is tightened, the rod unit 91 will separate from the rotary unit 3 so that the wheel 32 of the rotary unit 3 will perpendicular to the retainer frame 1.

Figure 6:
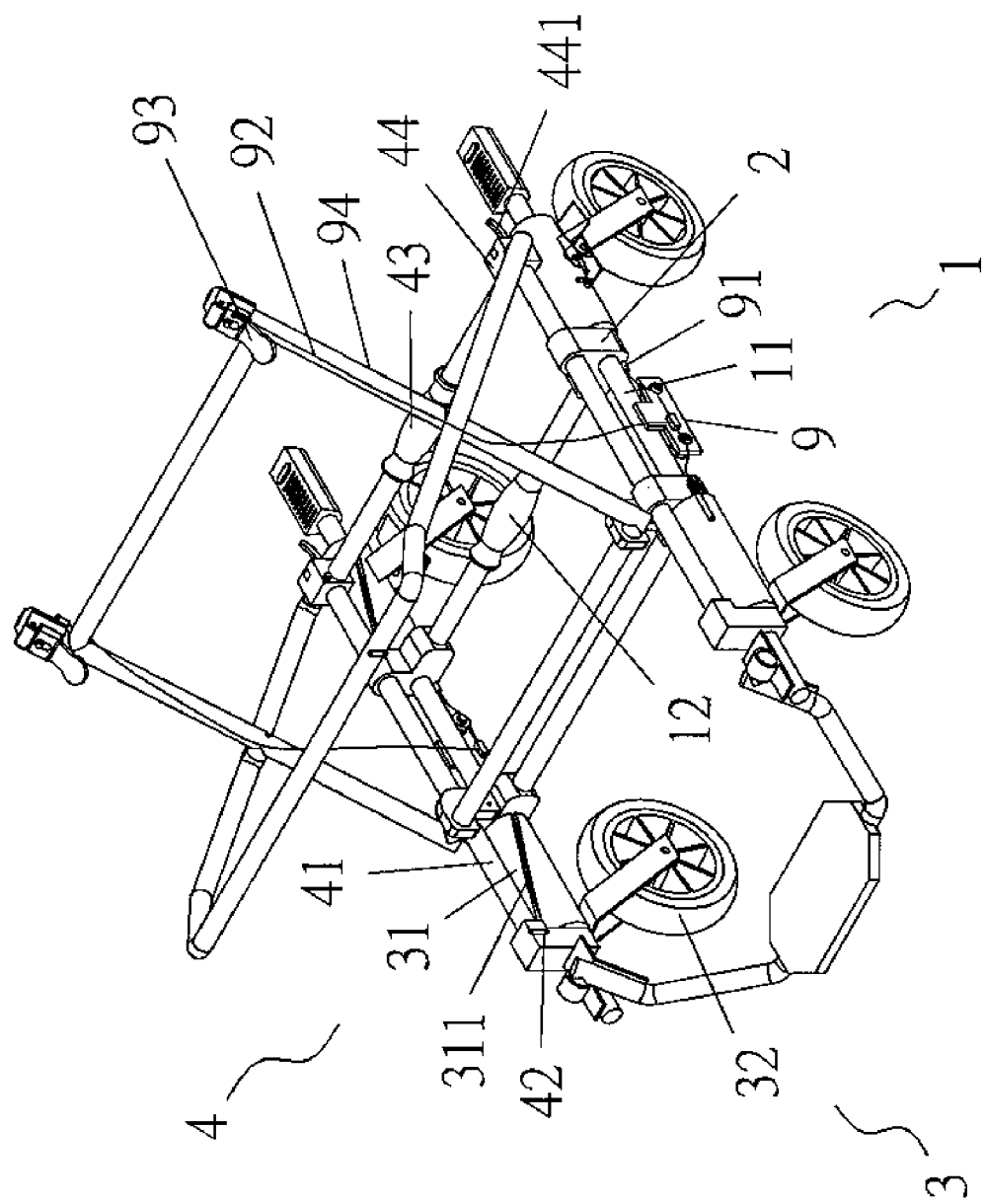
FIG. 6 is a schematic view showing the operation of the wheel frame assembly capable of being folded and expanded in the second embodiment of the present invention.
Figure 7:
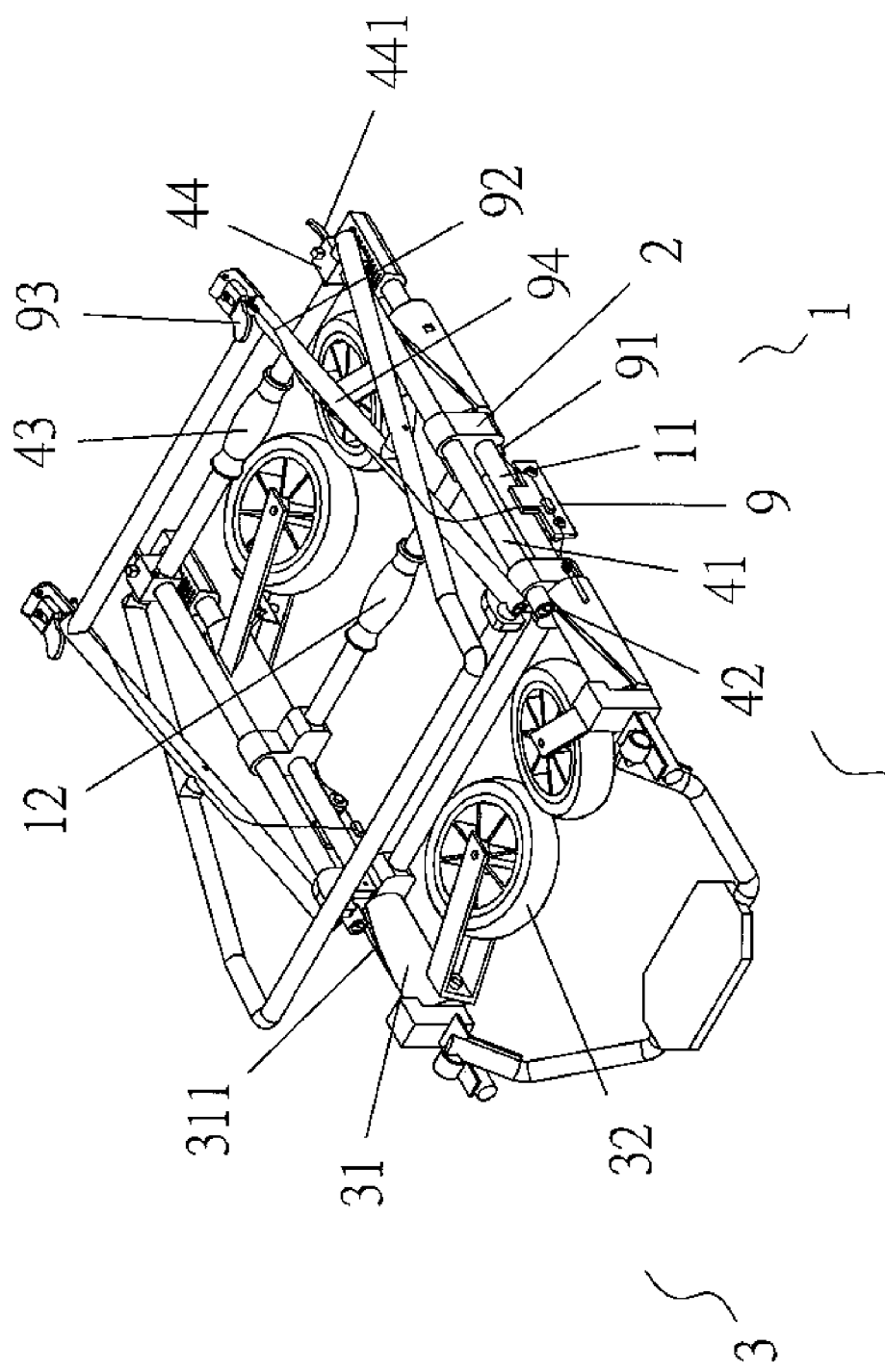
FIG. 7 is a schematic view showing another operation of the wheel frame assembly capable of being folded and expanded in the second embodiment of the present invention.
Figure 8:
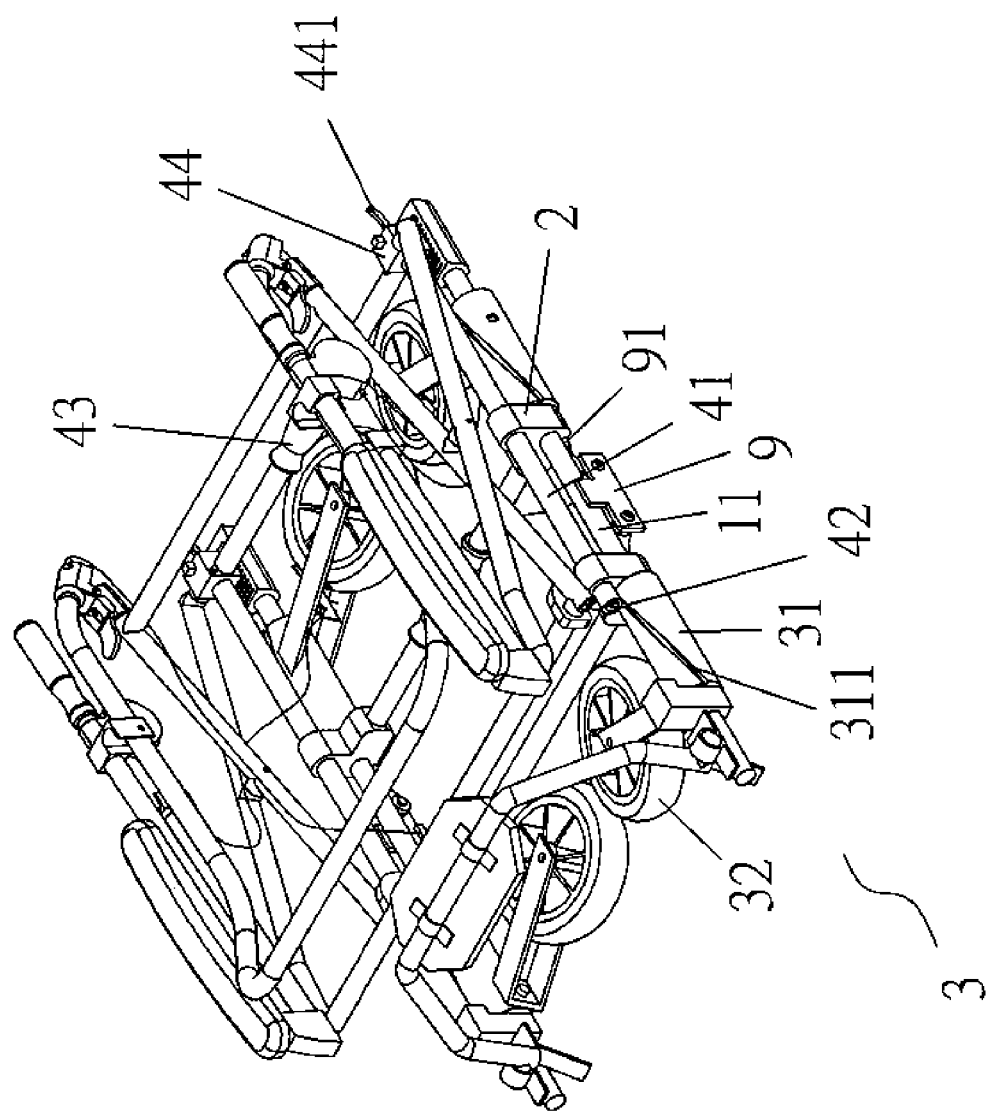
FIG. 8 is a schematic view showing a further operation of the wheel frame assembly capable of being folded and expanded in the second embodiment of the present invention.

Referring to FIGS. 6, 7 and 8, when the wheel 32 of the rotary unit 3 is expanded and to be folded, the user can turn on the switch 93 of the rod unit 91 so that the rod unit 91 separate from the rotary unit 3 by the stud 441 of the positioning block 44 so as to drive the active rod 41 and the guide shaft 42 of the active frame 4 will move therewith. Since the active rod 41 is limited by the guide shaft 42, it will move steadily. The guide shaft 42 at each end portion of each active frame 41 is at a higher position of the guide trench 311 of the rotary unit 3, during the movement of the guide shaft 42, it will move along the guide trench 311 of the sleeve 31 of the rotary unit 3. As a result, the guide trench 311 will rotate gradually by the affection of the movement of the guide shaft 42. Thus the wheel 32 is folded to be in parallel to the retainer frame 1 and the active frame 4. Thus it can be carried and stored easily and conveniently. On the contrary, when it is desired to expand the wheel 32 of the rotary unit 3, it is only necessary to the expand the active frame 4, so that the guide shaft 42 is pushed outwards and thus the sleeve 31 of the rotary unit 3 is affected by the guide shaft 42 of the active rod 41 to rotate reversely. As a result, the wheel is expanded. Then the stud 441 of the positioning block 44 will be used to fix the rotary unit 3. The operation is easily.

Advantages of the present invention will be described herein. In the present invention, the wheel of the rotary unit can be folded and to be parallel to the retainer frame so that it is convenient for storage and carrying out. Furthermore, the structure of the present invention is simple and assembly work can be performed easily and rapidly.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:
1. A wheel frame assembly capable of being folded and expanded, comprising:
a retainer frame having two parallel retaining rods and at least one transversal rod to be between the two retaining rods so that the two retaining rods are firmly secured in a parallel relation; and each retaining rod being engaged with a bush; each bush having at least one axial hole;

at least two rotary units; each rotary unit being formed by assembling a sleeve with a wheel; an inner wall of the sleeve being formed with a slightly cambered guide trench; a front end of the guide trench being higher than a rear end thereof; each sleeve of the rotary units being engaged to a corresponding one of front ends and rear ends of the two retaining rods so that the sleeves can drive the wheels to rotate along the two retaining rods;

an active frame has two parallel active rods; at least one transversal bar for positioning the active rods; each active rod being penetrated by a guide shaft and a positioning block; the guide shaft penetrating through a bottom of the active rod; each positioning block having a stud; each active rod passing through an axial hole of the bush so that the active frame is fixed at an upper side of the retainer frame and each guide shaft being penetrated into the guide trench of the rotary unit;

a pin assembly installed to the retaining rod of the retainer frame; the pin assembly including a rod unit which is engaged to the rotary unit; the pin assembly having a wire for controlling the rod unit to separate from the rotary unit; the wire being connected to a switch on a linkage; when the switch is turned on, the wire is tightened, the rod unit will separate from the rotary unit.

2. The wheel frame assembly capable of being folded and expanded as claimed in claim 1, wherein the retainer frame is combined to one of a wheelchair, a foldable chair, an office chair, a dray, and another object having at least one wheel so as to provide more function to the object.

3. The wheel frame assembly capable of being folded and expanded as claimed in claim 1, wherein the active frame is combined to one of a wheelchair, a foldable chair, an office chair, a dray, and another object having at least one wheel so as to provide more function to the object.

4. The wheel frame assembly capable of being folded and expanded as claimed in claim 2, wherein the wheel has a brake.

5. The wheel frame assembly capable of being folded and expanded as claimed in claim 3, wherein the wheel has a brake.

* * * * *